US008315211B2

(12) United States Patent  
Frank (10) Patent No.: US 8,315,211 B2
(45) Date of Patent: Nov. 20, 2012

(54) METHOD AND SYSTEM FOR LOCATION BASED CONFIGURATION OF A WIRELESS ACCESS POINT (WAP) AND AN ACCESS DEVICE IN A HYBRID WIRED/WIRELESS NETWORK

(75) Inventor: Ed H. Frank, Atherton, CA (US)

(73) Assignee: Broadcom Corporation, Irvine, CA (US)

( * ) Notice: Subject to any disclaimer, the term of this patent is extended or adjusted under 35 U.S.C. 154(b) by 2117 days.

(21) Appl. No.: 10/658,142

(22) Filed: Sep. 9, 2003

(65) Prior Publication Data

US 2004/0051664 A1   Mar. 18, 2004

Related U.S. Application Data

(60) Provisional application No. 60/411,301, filed on Sep. 17, 2002, provisional application No. 60/411,261, filed on Sep. 17, 2002, provisional application No. 60/433,106, filed on Dec. 13, 2002.

(51) Int. Cl.
*H04W 4/00* (2009.01)

(52) U.S. Cl. .......................... 370/329; 370/338; 370/389

(58) Field of Classification Search .................. 370/208, 370/229, 230, 235, 252, 254, 328, 329, 331, 370/338, 352
See application file for complete search history.

(56) References Cited

U.S. PATENT DOCUMENTS

| | | | | |
|---|---|---|---|---|
| 5,371,738 A | * | 12/1994 | Moelard et al. | 370/331 |
| 5,875,185 A | * | 2/1999 | Wang et al. | 370/331 |
| 6,259,405 B1 | | 7/2001 | Stewart et al. | |
| 6,768,730 B1 | * | 7/2004 | Whitehill | 370/348 |
| 6,771,609 B1 | * | 8/2004 | Gudat et al. | 370/254 |
| 6,792,265 B1 | * | 9/2004 | Chan et al. | 455/416 |
| 7,039,027 B2 | * | 5/2006 | Bridgelall | 370/329 |
| 7,042,867 B2 | * | 5/2006 | Whitehill et al. | 370/338 |
| 7,181,214 B1 | * | 2/2007 | White | 455/435.1 |
| 7,200,673 B1 | * | 4/2007 | Augart | 709/238 |
| 7,433,691 B1 | * | 10/2008 | White | 455/445 |
| 7,561,068 B1 | * | 7/2009 | Denker et al. | 340/988 |
| 2002/0085516 A1 | * | 7/2002 | Bridgelall | 370/329 |
| 2002/0098852 A1 | | 7/2002 | Goren et al. | |
| 2002/0150050 A1 | * | 10/2002 | Nathanson | 370/241 |

(Continued)

FOREIGN PATENT DOCUMENTS

DE    19836145    2/2000

(Continued)

OTHER PUBLICATIONS

Lin et al., "Multihop Wireless IEEE 802.11 LANs: A Prototype Implementation", 2000 KICS, pp. 1-7.*

(Continued)

*Primary Examiner* — Jung Park
(74) *Attorney, Agent, or Firm* — Thomas|Horstemeyer, LLP.

(57) ABSTRACT

Aspects of the invention provide a method and system for location based configuration of a wireless access point and an access device in a hybrid wired/wireless network. A method for providing location based configuration in a hybrid wired/wireless network may include identifying a location of a network device within the hybrid wired/wireless network. Configuration information corresponding to the determined location of the network device may be determined. The determined configuration information may be communicated to the networking device in order to facilitate location based configuration of the network device. The network device may include, but is not limited to, an access device, an access point and a switching device.

27 Claims, 8 Drawing Sheets

U.S. PATENT DOCUMENTS

| | | | |
|---|---|---|---|
| 2002/0154613 A1* | 10/2002 | Shahrier | 370/331 |
| 2003/0007473 A1* | 1/2003 | Strong et al. | 370/338 |
| 2003/0112182 A1* | 6/2003 | Bajikar | 342/457 |
| 2003/0193895 A1* | 10/2003 | Engwer et al. | 370/241 |

FOREIGN PATENT DOCUMENTS

| | | | |
|---|---|---|---|
| DE | 19836145 A1 | 2/2000 | |
| WO | 0158180 A2 | 8/2001 | |
| WO | WO0158180 | 8/2001 | |
| WO | 0223926 A2 | 3/2002 | |
| WO | WO0223926 | 3/2002 | |
| WO | 2004027445 A1 | 4/2004 | |

OTHER PUBLICATIONS

EPO Communication dated Jan. 19, 2011 in Application 03752124.2-2413 / 1552320.

EP Communication and Search Report, EP Patent Application No. 04018047.3-1249, completed Oct. 13, 2011, 3 pages.

* cited by examiner

METHOD AND SYSTEM FOR LOCATION BASED CONFIGURATION OF A WIRELESS ACCESS POINT (WAP) AND AN ACCESS DEVICE IN A HYBRID WIRED/WIRELESS NETWORK

CROSS-REFERENCE TO RELATED APPLICATIONS/INCORPORATION BY REFERENCE

This application makes reference to, claims priority to and claims the benefit of U.S. Provisional Patent Application Ser. No. 60/411,301 entitled "Method and System for Providing a Scalable Integrated Switch and Wireless Architecture" filed on Sep. 17, 2002;
U.S. Provisional Patent Application Ser. No. 60/411,261 entitled "Communications Systems Software and Protocols" filed on Sep. 17, 2002; and
U.S. Provisional Application Ser. No. 60/433,106 entitled "Method and System for Location Based configuration of a Wireless Access Point (WAP) and an Access Device in a hybrid Wired/Wireless Network" filed on Dec. 13, 2002.

The above stated applications are all incorporated herein by reference in their entirety.

FIELD OF THE INVENTION

Embodiments of the present application relate generally to hybrid wired/wireless networking, and more particularly to a method and system for configuring devices in a hybrid wired/wireless network.

BACKGROUND OF THE INVENTION

Figure 1A:
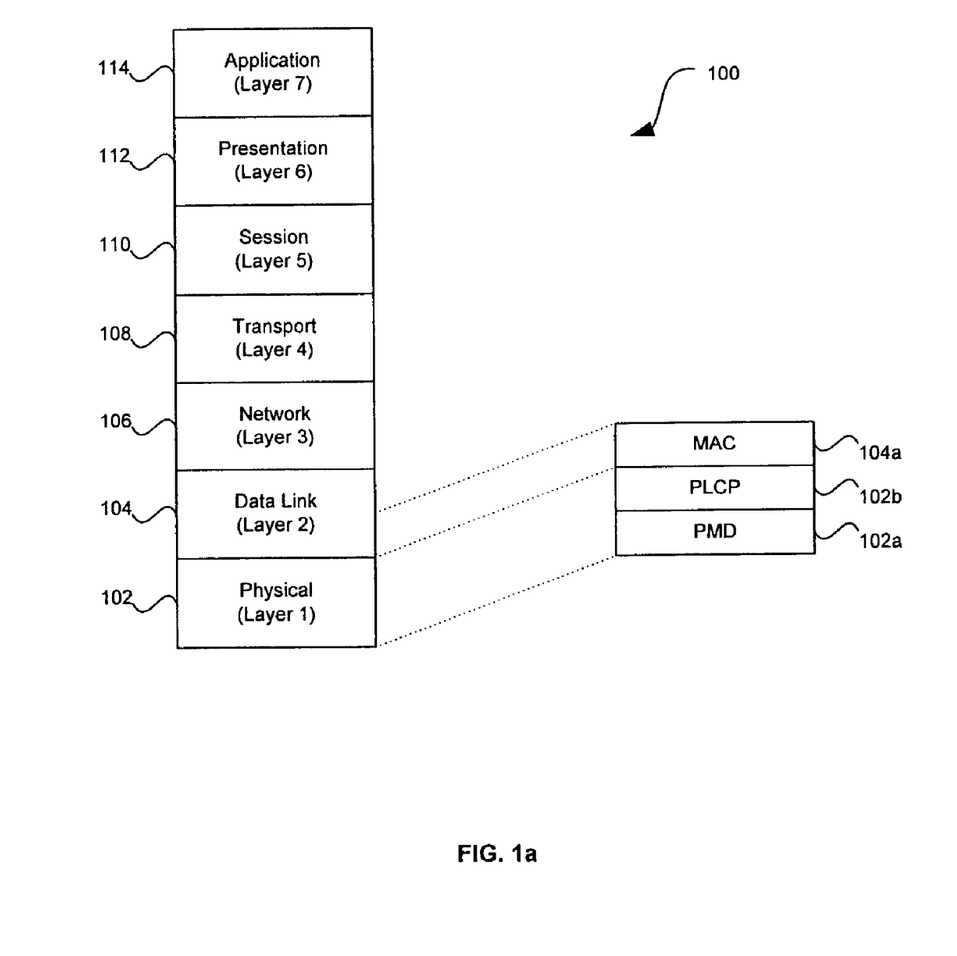
FIG. 1a is a block diagram of the OSI model.

The Open Systems Interconnection (OSI) model promulgated by the International standards organization (ISO) was developed to establish standardization for linking heterogeneous computer and communication systems. The OSI model describes the flow of information from a software application of a first computer system to a software application of a second computer system through a network medium. FIG. 1a is a block diagram 100 of the OSI model. Referring to FIG. 1a, the OSI model has seven distinct functional layers including layer 7, an application layer 114; layer 6, a presentation layer 112; layer 5, a session layer 110; layer 4, a transport layer 108; layer 3, a network layer 106; layer 2: a data link layer 104; and layer 1, a physical layer 102. The physical (PHY) layer 102 may further include a physical layer convergence procedure (PLCP) sublayer 102b and a physical media dependent (PMD) sublayer 102a. The data link layer 104 may also include a Medium access control (MAC) layer 104a.

In general, each OSI layer describes certain tasks which are necessary for facilitating the transfer of information through interfacing layers and ultimately through the network. Notwithstanding, the OSI model does not describe any particular implementation of the various layers. OSI layers 1 to 4 generally handle network control and data transmission and reception, generally referred to as end-to-end network services. Layers 5 to 7 handle application issues, generally referred to as application services. Specific functions of each layer may vary depending on factors such as protocol and/or interface requirements or specifications that are necessary for implementation of a particular layer. For example, the Ethernet protocol may provide collision detection and carrier sensing in the physical layer. Layer 1, the physical layer 102, is responsible for handling all electrical, optical, opto-electrical and mechanical requirements for interfacing to the communication media. Notably, the physical layer 102 may facilitate the transfer of electrical signals representing an information bitstream. The physical layer 102 may also provide services such as, encoding, decoding, synchronization, clock data recovery, and transmission and reception of bit streams.

The PLCP layer 102b may be configured to adapt and map services provided by the physical layer 102 to the functions provided by the device specific PMD sublayer 102a. Specifically, the PLCP layer 102b may be adapted to map PHY sublayer service data units (PDSUs) into a suitable packet and/or framing format necessary for providing communication services between two or more entities communicating via the physical medium. The PMD layer 102a specifies the actual methodology and/or protocols which may be used for receiving and transmitting via the physical medium. The MAC sublayer 104a may be adapted to provide, for example, any necessary drivers which may be utilized to access the functions and services provided by the PLCP sublayer 102b. Accordingly, higher layer services may be adapted to utilize the services provided by the MAC sublayer 104a with little or no dependence on the PMD sublayer 102a.

802.11 is a suite of specifications promulgated by the Institute of Electrical and Electronics Engineers (IEEE), which provide communication standards for the MAC and physical (PHY) layer of the OSI model. The 802.11 standard also provides communication standards for wired and wireless local area networks (WLANs). More specifically, the 802.11 standard specifies five (5) types of physical layers for WLANs. These include, frequency hopping spread spectrum (FHSS), direct sequence spread spectrum (DSS), infrared (IR) communication, high rate direct sequence spread spectrum (HR-DSS) and orthogonal frequency division multiplexing (OFDM). The 802.11 standard also provides a PLCP frame format for each of the specified PHY layers.

Over the past decade, demands for higher data rates to support applications such as streaming audio and streaming video, have seen Ethernet speeds being increased from about 1-2 megabit per second (Mbps), to 10 Mbps, to 100 Mbps, to 1 gigabit per second (Gbps) to 10 Gbps. Currently, there are a number of standards in the suite of specifications, namely 802.11b, 802.11a and 802.11g which have been adapted to facilitate the demands for increased data rates. The 802.11g standard for example, provides a maximum data rate of about 54 Mbps at a transmitter/receiver range of 19 meters (m) in a frequency range of 2.4 GHz to 2.4835 GHz. The 802.11b standard for example, provides a maximum data rate of about 11 Mbps at a transmitter/receiver range of 57 meters (m) in a frequency range of 2.4 GHz to 2.4835 GHz. Finally, the 802.11a standard for example, may be adapted to provide a maximum data rate of about 54 Mbps at a transmitter/receiver range of 12 meters (m) in a 300 MHz segmented bandwidth ranging from 5.150 GHz to 5.350 GHz and from 5.725 GHz to 5.825 GHz.

The 802.11 standard forms the basis of the other standards in the suite of specifications, and the 802.11b, 802.11a and 802.11g standards provide various enhancements and new features to their predecessor standards. Notwithstanding, there are certain elementary building blocks that are common to all the standards in the suite of specifications. For example, all the standards in the suite of specifications utilize the Ethernet protocol and utilize carrier sense multiple access with collision avoidance (CSMA/CA).

CSMA/CA utilizes a simple negotiation scheme to permit access to a communication medium. If a transmitting entity wishes to transmit information to a receiving entity, the transmitting entity may sense the communication medium for communication traffic. In a case where the communication medium is busy, the transmitting entity may desist from making a transmission and attempt transmission at subsequent time. In a case where the communication transmission is not busy, then the transmitting entity may send information over the communication medium. Notwithstanding, there may be a case where two or more transmission entities sense that the communication medium is not busy and attempt transmission at the same instant. To avoid collisions and retransmissions, a CSMA/CA or ready to send (RTS) and clear to send (CTS) messaging scheme may be employed, for example. Accordingly, whenever a transmitting device senses that the communication medium is not busy, then the transmitting device may send a ready to send message to one or more receiving device. Subsequent to the receipt of the ready to send message, the receiving device may send a clear to send message. Upon receipt of the clear to send message by the transmitting device, the transmitting device may initiate transfer of data to the receiving device. Upon receiving packets or frames from the transmitting device, the receiving device may acknowledge the received frames.

The 802.11b standard, commonly called Wi-Fi, which represents wireless fidelity, is backward compatible with its predecessor standard 802.11. Although 802.11 utilizes one of two modulation formats including direct sequence spread spectrum (DSS) using differential binary phase shift keying and frequency hopping spread spectrum (11-bit Barker sequence), 802.11b utilizes a higher data rate form of DSS called complementary code keying (CCK). CCK permits higher data rate and particularly less susceptible to interference effects such as multipath-propagation interference, the PSK.

802.11a utilizes orthogonal frequency-division multiplexing (OFDM) modulation/encoding scheme, which provides a maximum data rate of 54 Mbps. Orthogonal frequency-division multiplexing is a digital modulation technique which splits a signal into several narrowband channels, with each channel having a different frequency. Each narrowband channel is arranged so as to minimize the effects of crosstalk between the channels and symbols in the data stream.

Since equipment designed to provide support for 802.11a operates at frequencies in the ranges 5.150 GHz to 5.350 GHz and from 5.725 GHz to 5.825 GHz, 802.11a equipment will not interoperate with equipment designed to operate with the 802.11b standard which defines operation in the 2.4 to 2.4835 GHz frequency band. One major drawback is that companies that have invested in 802.11b equipment and infrastructure may not readily upgrade their network without significant expenditure.

The 802.11g standard was developed as an extension to 802.11b standard. The 802.11g standard may utilize a similar OFDM modulation scheme as the 802.11a standard and delivers speeds comparable with the 802.11a standard. Since 802.11g compatible equipment operates in the same portion of the electromagnetic spectrum as 802.11b compatible equipment, 802.11g is backwards compatible with existing 802.11b WLAN infrastructures. Due to backward compatibility of 802.11g with 802.11b, it would be desirable to have an 802.11b compliant radio card capable of interfacing directly with an 802.11g compliant access point and also an 802.11g compliant radio card capable of interfacing directly with an 802.11b compliant access point.

Furthermore although 802.11g compatible equipment operates in the 2.4 GHz to 2.4835 GHz frequency range, a typical transmitted signal utilizes a bandwidth of approximately 22 MHz, about a third or 30% of the total allocated bandwidth. This limits the number of non-overlapping channels utilized by an 802.11g access point to three (3). A similar scenario exists with 802.11b. Accordingly, many of the channel assignment and frequency reuse schemes associated with the 802.11b standard may be inherent in the 802.11g.

RF interference may pose additional operational problems with 802.11b and 802.11g equipment designed to operate in the 2.4 GHz portion of the electromagnetic spectrum. The 2.4 GHz portion of the spectrum is an unlicensed region which has been utilized for some time and is crowded with potential interfering devices. Some of these devices include cordless telephone, microwave ovens, intercom systems and baby monitors. Other potential interfering devices may be Bluetooth devices. Accordingly, interference poses interference problems with the 802.11b and 802.11g standards.

802.11a compatible equipment utilizes eight non-overlapping channels, as compared to three non-overlapping channels utilized by 802.11b. Accordingly, 802.11a access points may be deployed in a more dense manner than, for example 802.11b compatible equipment. For example, up to twelve access points each having a different assigned frequency may be deployed in a given area without causing co-channel interference. Consequently, 802.11a may be particularly useful in overcoming some of the problems associated with channel assignment, especially in areas that may have a dense user population and where increased throughput may be critical. Notwithstanding, the higher operating frequency of 802.11a causes more attenuation resulting in a shorter operating range at a given data rate. This may significantly increase deployment cost since a larger number of access points are required to service a given service area.

In a hybrid wired/wireless network, given various operating conditions and requirements that may exist within various portions of the network and/or between various network domains, access devices may require configuration as they migrate within the network. Configuration may ensure network interoperability and optimal performance. Current networks lack an efficient method and system for configuring access devices and/or network devices within the network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide a method and system for location based configuration of a wireless access point and an access device in a hybrid wired/wireless network. A method for providing location based configuration in a hybrid wired/wireless network may include identifying a location of a network device within the hybrid wired/wireless network. Configuration information corresponding to the determined location of the network device may be determined. The determined configuration information may be communicated to the networking device in order to facilitate location based configuration of the network device. The network device may include, but is not limited to, an access device, an access point and a switching device.

In accordance with an aspect of the invention, configuration information may be discovered from at least one of a database, and a memory associated with at least one of the access points and a switching device. The discovering step may include scanning the database and the memory of one or more of the access device, access point and switching device to discover the configuration information for a particular location. The determining step may further include scanning at least one RF channel by at least one of the access points and the access devices to discover location based configuration information. The RF channel may be a broadcast channel and/or a setup channel.

A network device may be updated dynamically or on demand with the communicated configuration information. Dynamic updating of the network device may be done whenever it is determined that at least one network setting corresponding a location of the network device has changed. The determined information may include but is not limited to, one or more of bandwidth etiquette and sharing rules, channel availability, preferred channel, and available communication protocols. The determining step may further include sending a ping message and receiving routing information associated with ping message and triangulating locations of routing devices named in the received routing information in order to determine a location of a network device.

Another aspect of the invention provides a machine-readable storage, having stored thereon a computer program having at least one code section for providing location based configuration in a hybrid wired/wireless network, the at least one code section executable by a machine for causing the machine to perform the steps described above.

Another aspect of the invention provides a system for location based configuration in a hybrid wired/wireless network. The system may include an identifier adapted to identify a location of a network device within the hybrid wired/wireless network and a determinator adapted to determine configuration information corresponding to said determined location of said network device. A communicator may be adapted to communicate the determined configuration information to the networking device for providing location based configuration of the network device. The network device may be one of an access device, an access point and a switching device. A discoverer may be adapted to discover configuration information from at least one of a database, and a memory associated with at least one of said access point and said switching device. A scanner may be adapted to scan the database and/or the memory of the access device, access point and/or switching device to discover location based configuration information. A scanner may also be adapted to scan at least one RF channel by an access point and an access device to discover location based configuration information. The RF channel may be a broadcast channel and/or a setup channel. An updater may be adapted to update the network device with the communicated configuration information, dynamically or on demand. The updater may dynamically update the network device with the communicated information whenever it is determined that at least one network setting corresponding to a location of the network device has changed. The determined information may include, but is not limited to, one or more of bandwidth etiquette and sharing rules, channel availability, preferred channel, and available communication protocols.

The system may also include a sender adapted to send at least one ping message and a receiver adapted to receive routing information associated with the sent ping message. A triangulator may be adapted to triangulate locations of routing devices named in the received routing information to determine the location of the network device. In another aspect of the invention, at least one querying agent may be provided for querying a network device for location information. At least one informing agent may be provided for informing at least one of the access point, access device and switching device of at least one network parameter related to location based configuration.

These and other advantages, aspects and novel features of the present invention, as well as details of an illustrated embodiment thereof, will be more fully understood from the following description and drawings.

DETAILED DESCRIPTION OF THE INVENTION

Aspects of the invention provide a method and system for location based configuration of a wireless access point and an access device in a hybrid wired/wireless network. The system may include at least one querying agent for querying a network device for location information and at least one determinator for determining configuration information based on the location information. At least one informing agent may be provided to inform at least one of an access point, switch, and access device of network parameters related to the configuration.

Figure 1B:
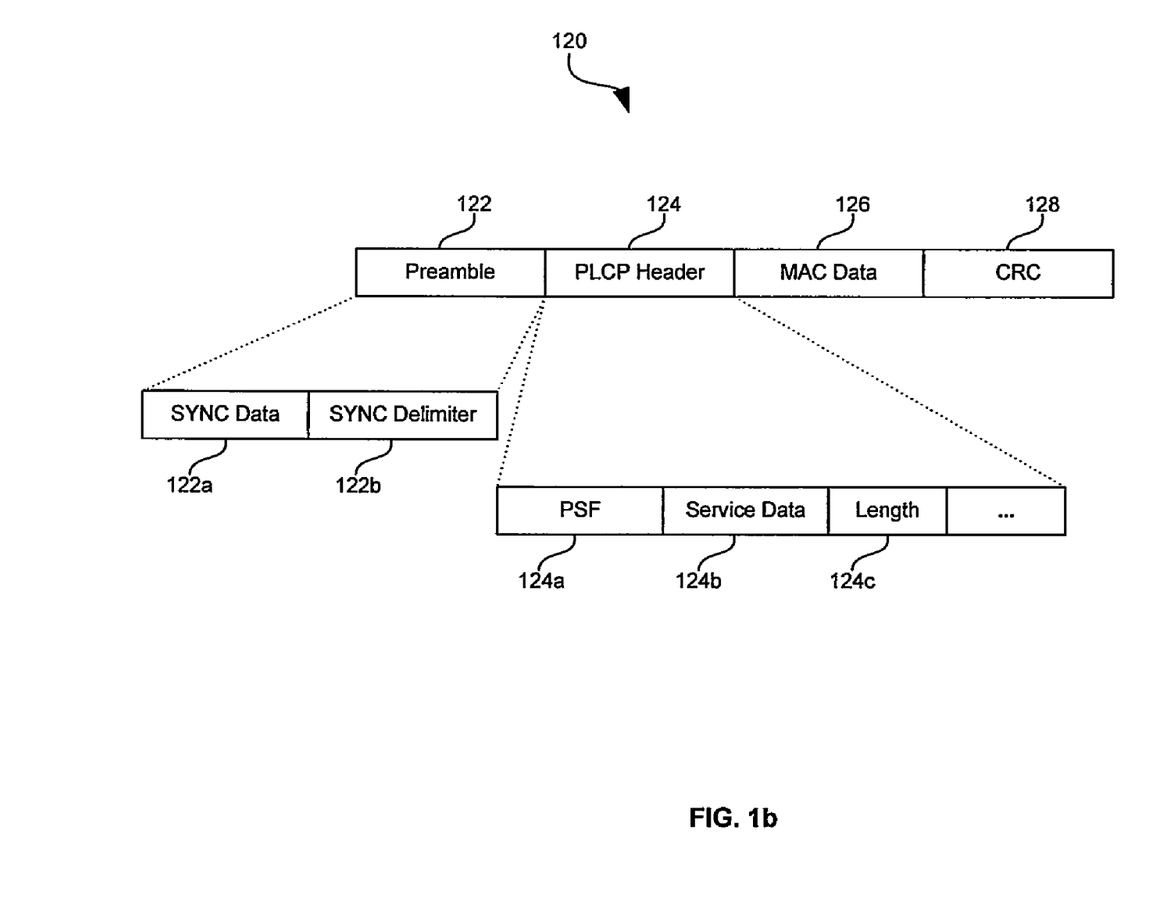
FIG. 1b is a block diagram illustrating a general PLCP frame as defined by 802.11.

FIG. 1b is a block diagram 120 illustrating a general PLCP frame as defined by 802.11. Referring to FIG. 1b, there is shown preamble 122, PLCP header 124, MAC data 126, and CRC 128. Preamble 122 may include synchronization (SYNC) data 122a and synchronization delimiter 122b. The PLCP header 124 may include, for example PLCP signal field (PSF) 124a, service data 124b, length 124c and other fields. The preamble 122 may be dependent on the PHY. The SYNC data 122a may include a unique bit stream that may be adapted to signal timing parameters such as the start of a frame. The SYNC data 122a is used for bit synchronization and demodulation. The SYNC delimiter 122b provides frame timing information and may be adapted to delimit the end of synchronization information. The PLCP header 124 may be adapted to contain information used for decoding the frame. For example, the PSF 124a may be adapted to include communication data rate information. The service data 124b is generally reserved, but may be utilized to provide application specific functionality. The length 124c may be adapted to indicate the length of the MAC data 126. In this regard, the length 124c may be expressed in terms of the time required to transmit the MAC data 126.

Figure 1C:
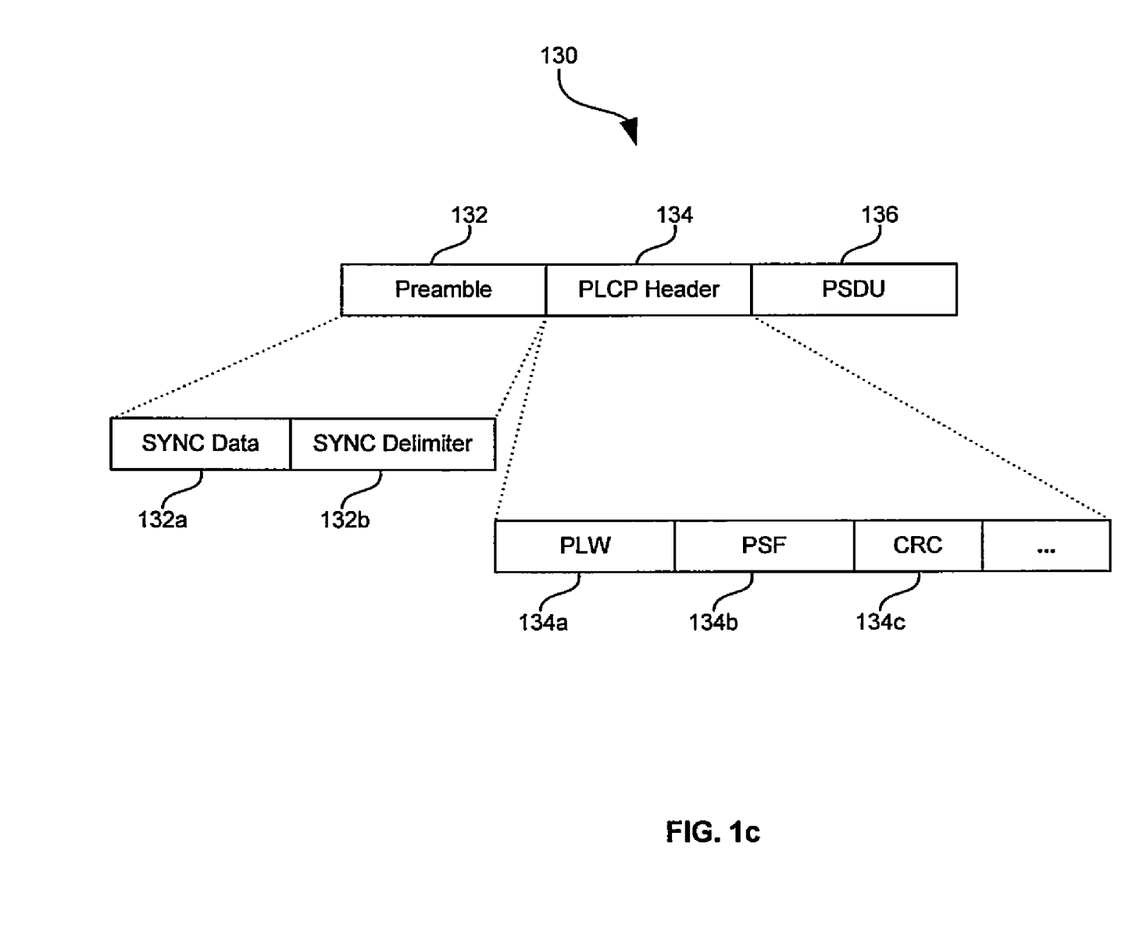
FIG. 1c is a block diagram illustrating a PLCP frame utilized by frequency hopping spread spectrum as defined by 802.11.

FIG. 1c is a block diagram 130 illustrating a PLCP frame utilized by frequency hopping spread spectrum as defined by 802.11. Referring to FIG. 1c, there is shown preamble 132, PLCP header 134 and PSDU 136. Preamble 132 may include synchronization (SYNC) data 132a and synchronization delimiter 132b. The PLCP header 134 may include, for example, PSDU length word (PLW) 134a, PLCP signaling field (PSF) 134b, header error check field or CRC 134c and other fields. The PLW 134a may specify the number of octets contained in the PSDU 136. The PSF 134b be may be 4-bits in length and may be used to denote the communication data rate.

Figure 1D:
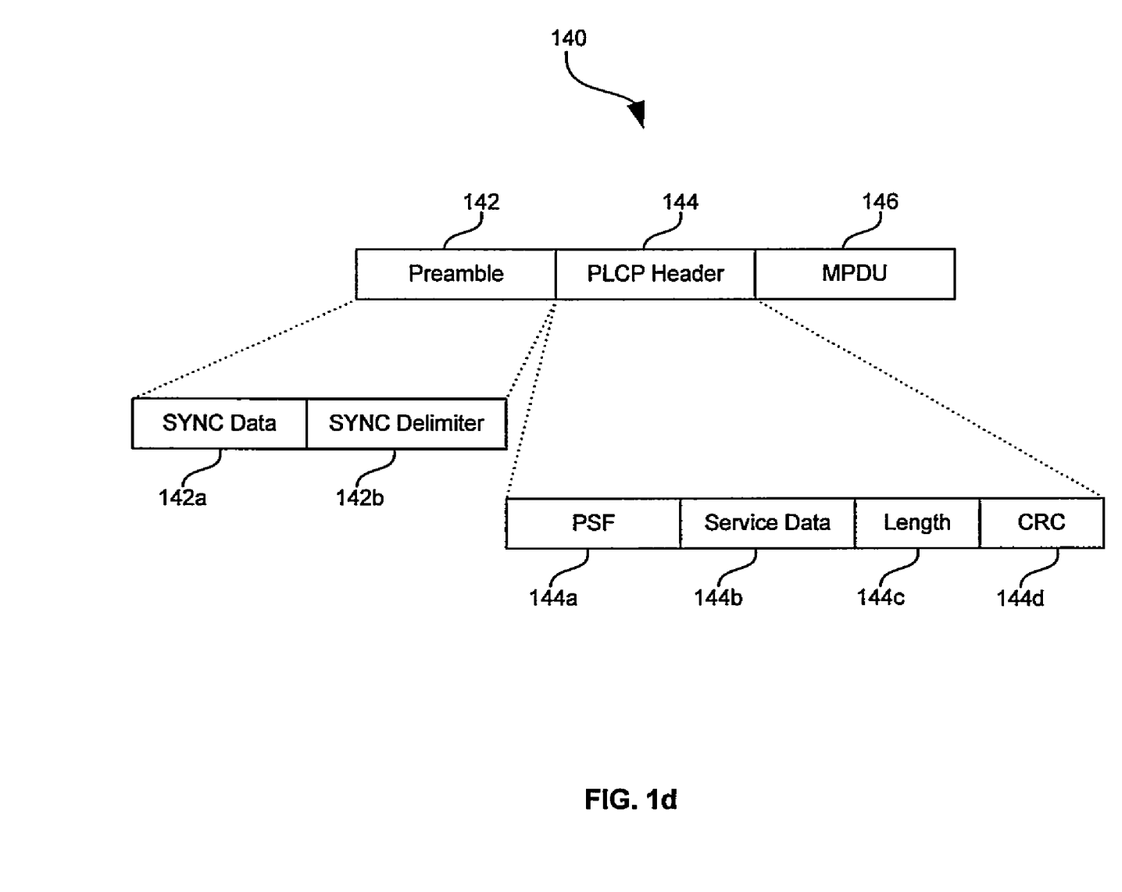
FIG. 1d is a block diagram illustrating a PLCP frame for direct sequence spread spectrum and high rate direct sequence spread spectrum as defined by 802.11.

FIG. 1d is a block diagram 140 illustrating a PLCP frame for direct sequence spread spectrum and high rate direct sequence spread spectrum (HR-DSS) as defined by 802.11. Referring to FIG. 1d, there is shown preamble 142, PLCP header 144 and MPDU 146. Preamble 142 may include synchronization (SYNC) data 142a and synchronization delimiter 142b. The PLCP header 144 may include PLCP signal field (PSF) 144a, service data 144b, length 144c, and CRC field 144d. The SYNC data 142a may be 128 bits as compared to 8 bits for SYNC data 132a for frequency hopping spread spectrum. The CRC 144d is 16 bits, which is similar to CRC 134c for frequency hopping spread spectrum.

Figure 1E:
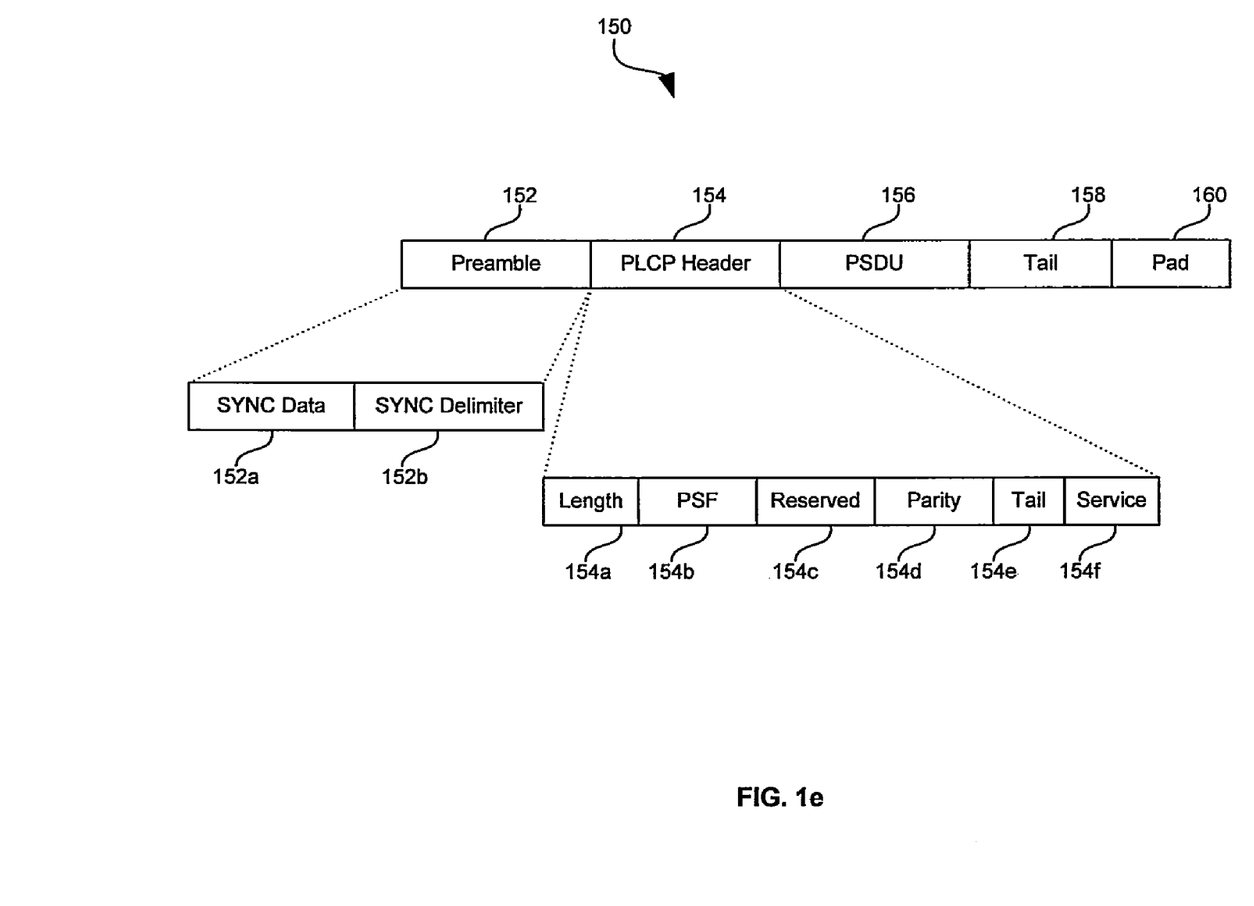
FIG. 1e is a block diagram illustrating a PLCP frame for orthogonal frequency division multiplexing as defined by 802.11.

FIG. 1e is a block diagram 150 illustrating a PLCP frame for orthogonal frequency division multiplexing as defined by 802.11. Referring to FIG. 1e, there is shown preamble 152, PLCP header 154 and PSDU 156, tail 158 and pad 160. Preamble 152 may include synchronization (SYNC) data 152a and synchronization delimiter 152b. The PLCP header 154 may include length 154a, PLCP signal field (PSF) 154b, reserved field 154c, parity 154d, tail 154e and service 154f. The length 154a is a 12-bit field that may be adapted to indicate the length of the frame. The PSF 154b is a 4-bit field that may indicate a modulation scheme utilized and its associated coding rate of the PSDU. For example, the specification utilizes binary 1011 to represent 6 Mbps, 1111 to represent 9 Mbps, 1010 to represent 12 Mbps, 1110 to represent 18 Mbps, 1001 to represent 24 Mbps, 1011 to represent 36 Mbps, 1000 to represent 48 Mbps and finally, 1100 to represent the maximum standardized rate if 54 Mbps. The reserved field 154c is a 1 bit field that is reserved for future use and may be adapted for application specific use. The parity field 154d may indicate odd or even parity. The tail field 154e is a 6-bit field. The service field 154f is a 16-bit field that may be adapted to indicate the type of service.

Figure 2:
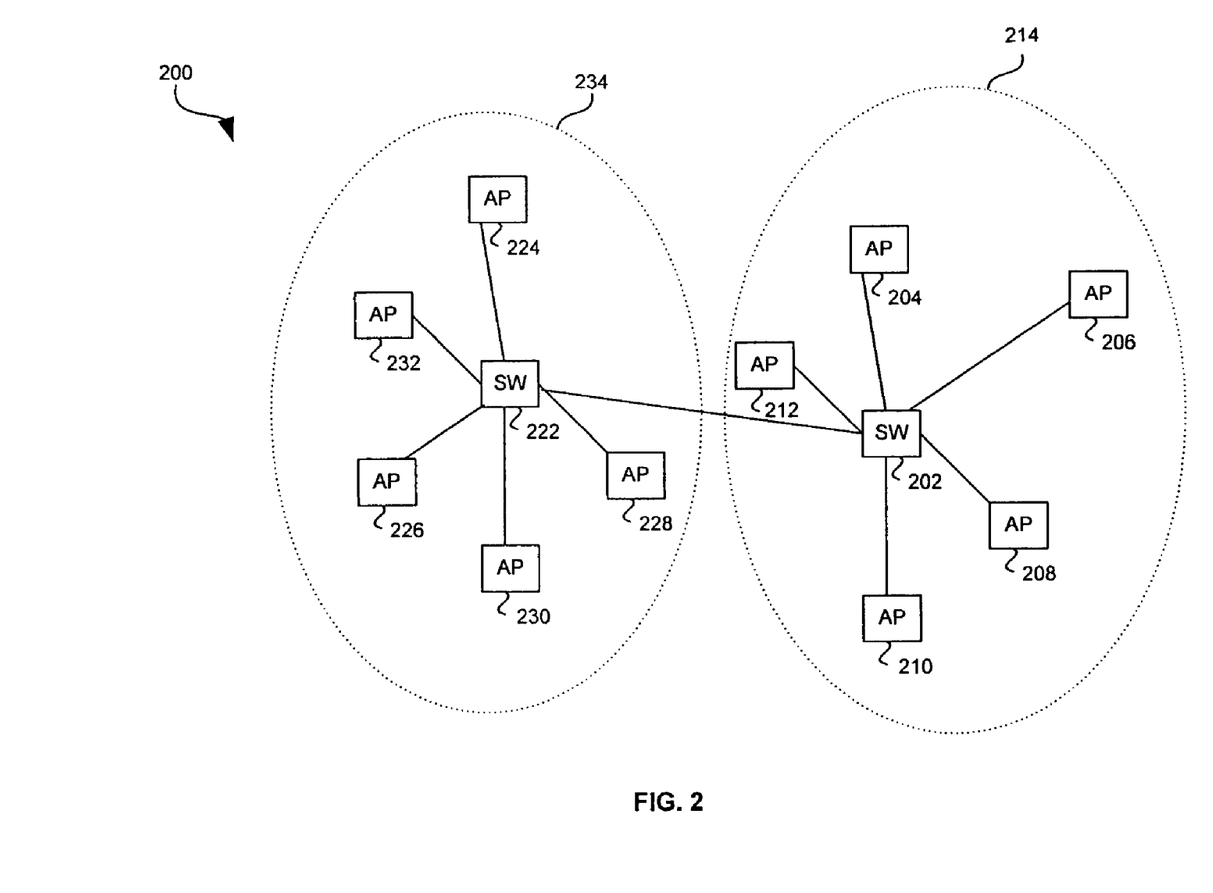
FIG. 2 is a block diagram of an exemplary system for providing location based configuration in a hybrid wired/wireless network in accordance with an embodiment of the invention.

FIG. 2 is a block diagram 200 of an exemplary system for providing location based configuration in a hybrid wired/wireless network in accordance with an embodiment of the invention. Referring to FIG. 2, there is illustrated a first networking domain 214 and a second networking domain 234. The first networking domain 214 may include a switch 202, and access points 204, 206, 208, 210, 212. Each of access points 204, 206, 208, 210, 212 may be coupled to the switch 202. The second networking domain 234 may include a switch 222, and access points 224, 226, 228, 230, 232. Each of access points 224, 226, 228, 230, 232 may be coupled to the switch 222. Switch 222 may be coupled to switch 202 through any one or more of a wired and a wireless medium. Although not shown, at least some of the access points in any one of the networking domains 214, 234 may be coupled to each other. Notwithstanding, a plurality of actual and/or virtual channels may be provided to facilitate communication with the access points and switches. Although the networking domains 214 and 234 are illustrated as separate networking entities, the invention is not so limited. Accordingly, the networking domains 214, 234 may be part of a single networking entity, but may also represent separate security domains within the single networking entity.

In operation, any one or more of the access points in any one or more of the networking domains 214, 234 may be adapted to receive network management related information and parameters from one or more of the switches 202, 222. In one embodiment of the invention, for example, access point 206 may be adapted to receive for example, bandwidth information from switch 202. Similarly, any one or more of access points 204, 206, 208, 210, 212 may receive network management related information from switch 202. Similarly, any one or more of access points 224, 226, 228, 230, 232 may receive network management related information from switch 222.

In another aspect of the invention, the switches 202, 222 may be adapted to provide certain QoS management activities to the access points using a messaging protocol. Accordingly, some activities such as bandwidth policing, bandwidth management, load balancing, roaming and handover may be handled by coordinating one or more switches and one or more access points utilizing a messaging protocol. Notwithstanding, a switch may be adapted to establish rules that may be utilized by the access points in carrying out these activities. The rules may be propagated from the switches to the access points using the messaging protocol. Prioritization and processing, for example, may be based on acceptable levels of latency and bandwidth availability. For example, an IP telephone call may be assigned highest queuing and processing priority in order to minimize latency. Policing, for example, may include tasks which limit and control the usage of available bandwidth by a particular access device or a type of access device. All these tasks may be controlled using the messaging protocol.

In accordance with various embodiments of the invention, dependent on the modulation scheme utilized, one or more of the PLCP frames illustrated in FIG. 1b, FIG. 1c, FIG. 1d and FIG. 1e may be adapted to contain information which may be utilized for providing network management for switches and access points. Additionally, the PLCP frames may be adapted to convey information for any one or more of, for example, the 801.11a, 802.11b and 802.11g modes of operation utilized by access points and/or access devices in accordance the embodiments of the invention.

The messaging protocol (MP) may be used for communication by an access device in for example, an enterprise Wireless LAN (WLAN), in order to provide services such as enhanced WLAN service to access devices or mobile stations. The communication, in addition to ordinary WLAN device communication such as authentication, authorization, key exchanges, beacon broadcast, etc., may provide additional features not provided by a WLAN to its clients. These additional features may include, but are not limited to, access control, load balancing, network management and quality of service. Enterprise WLAN devices that may utilize MP message transactions may include but are not limited to, wireless access points, enterprise switches, and wireless stations. These devices may be MP enabled in some instances.

In accordance with the invention, an exemplary WLAN Architecture is provided. In an enterprise Wireless LAN environment, the wireless devices may be located at the edge of the network. They may be connected or coupled to the enterprise network via the one or more access points, which in turn may be the edge devices of, for example, a wired LAN. The access points may be connected to the LAN via switches. These switches, called Wireless LAN Switches, in certain instances, do not only perform Layer 2 switching, but may be adapted to function as a wireless edge manager. However, the invention is not limited is this regard and the switches may be adapted, in certain instances, to provide layer 2 switching. They may also provide additional functionalities like access control, firewall functions, traffic privacy and quality of service, network management, and load balancing.

Figure 3:
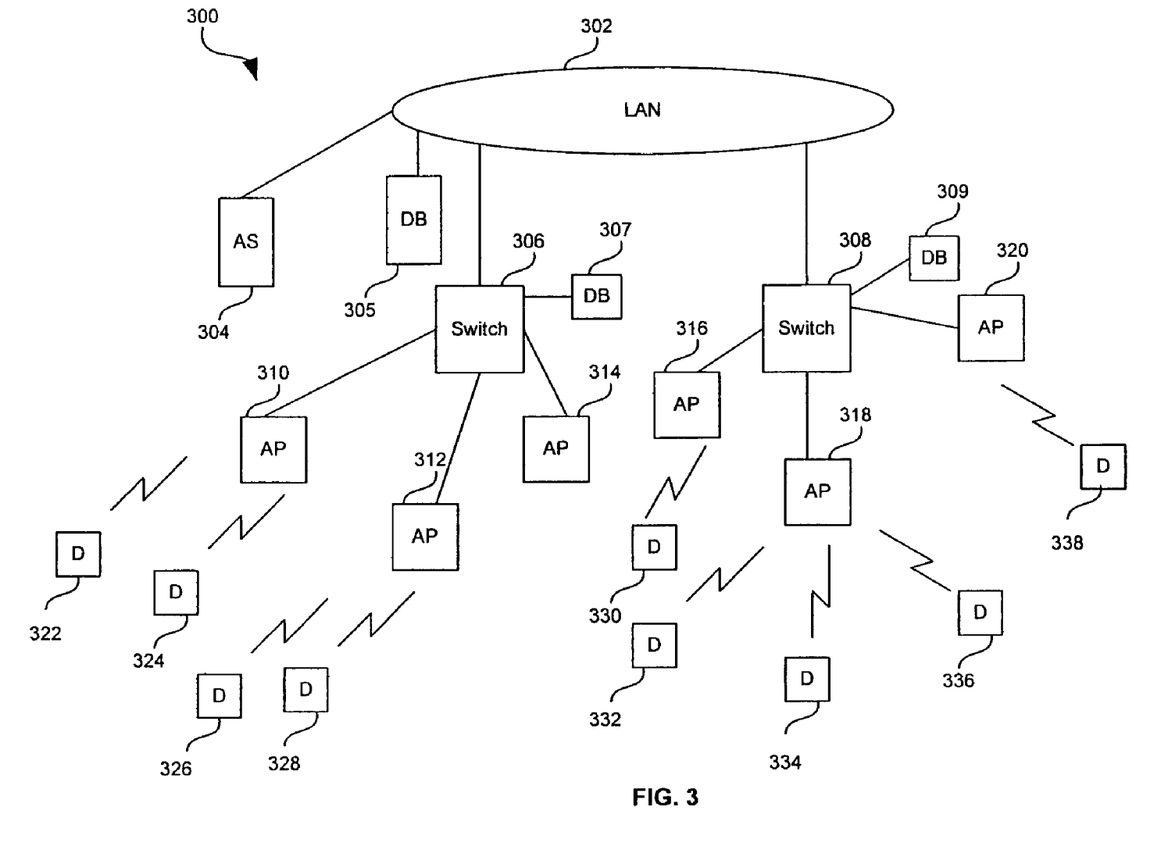
FIG. 3 is a more detailed block diagram of the exemplary system of FIG. 2 for providing location based configuration in a hybrid wired/wireless network in accordance with an embodiment of the invention.

FIG. 3 is a more detailed block diagram 300 of the exemplary system of FIG. 2 for providing location based configuration in a hybrid wired/wireless network in accordance with an embodiment of the invention. Referring to FIG. 3, there is shown, a local area network (LAN) 302, authentication server (AS) 304, switches 306, 308, access points (APs) 310, 312, 314, 316, 318, 320 and access devices (D) 322, 324, 326, 328, 330, 332, 334, 336, 338. A remote database (DB) 305 may be accessible via LAN 302. Databases (DB) 307, 309 may be associated with switches 306, 308, respectively.

Wireless transmission between the client and access point may be secure, while wired connections between access points and the switches 306, 308 may also be secure. The switches and APs such as 310, 312, 314, 316, 318, 320 may be adapted to communicate using, for example, Ethernet protocol. From the switch's perspective, the switch may be switching regular layer 2 frames. Within the switch, knowledge of a WLAN and its management intelligence may reside primarily in software.

In a typical hybrid wired/wireless network, especially those networks that may include multiple frequency bands and multiple protocols, as access devices become mobile throughout the network, a need arises to instantaneously dynamically configure access points 310, 312, 314, 316, 318, 320 and/or access devices 322, 324, 326, 328, 330, 332, 334, 336, 338. For example, when an access device moves from one geographical location to another and/or from one network domain to another, the channel capacity and ultimately the channel throughput may change with time. Similarly, whenever an access device is moved from one geographic location and/or domain, it may be dynamically reconfigured with minimal or no user intervention to ensure interoperability and/or optimal performance.

In one embodiment of the invention, a network device, such as any one of access points (APs) 310, 312, 314, 316, 318, 320 and/or switches 306, 308, may be configured to determine, for example, a geographical location such as a country or region in which it may be located. Accordingly, an access point and/or switch may be adapted to inform a client of various access rules and methodologies required for communication over a network to which it may be connected. The client may be an access device such as any one of access devices 322, 324, 326, 328, 330, 332, 334, 336, 338. In one aspect of the invention, the access point and/or switch may be adapted to inform the access device or client of, for example, various bandwidth etiquette and sharing rules, available channels, a best channel list, available protocols, etc. The location of, for example, an access device may also be domain based. Hence, as an access device moves from a first network domain to second network domain, configuration changes may be provided to the access device. Accordingly, configuration information related to the second network domain may be provided to the access device.

In an embodiment of the invention, the access point and/or switch may include one or more discovery agents and one or more informing agents. The discovery agents may also be referred to as querying agents. One or more of the querying and/or discovery agents may be adapted to discover information about the network. One or more of the informing agents may be adapted to dynamically inform a client or access device of discovered information and other network specific configuration information. In operation, an access point may be adapted to dynamically discover changes to network settings or parameters and inform clients or access devices of these changes or parameters. In one aspect of the invention, the access point may be adapted to actively scan for network configuration settings and/or changes. In another aspect of the invention, an access point may be adapted to passively scan for network configuration settings and/or changes to network setting and parameters. In this regard, at least one RF channel bearing configuration information may be provided and this RF channel may be scanned to obtain channel configuration based on location. In any case, these network settings and/or changes which may be included in the configuration settings may be communicated to, for example, access devices 322, 324, 326, 328, 330, 332, 334, 336, 338 and/or switches 306, 308.

At least some location dependent information may be stored in, for example, a local or remote database, a switch memory or an access point memory or associated database. For example, database 305 is a remote database that may be accessible via LAN 302. Database 307 may be coupled to the switch 306 and database 309 may be coupled to switch 308. Although databases 307, 309 are shown remote to the switches 306, 308, the invention is not limited in this regard and the databases could be internal to switches 306, 308. Additionally, location based configuration information may be stored in an associated memory of any of the access points 310, 312, 314, 316, 318, 320. The location dependent information may be stored in the database or memory upon system setup and/or initialization. Additionally, configuration information may be stored in the database or memory whenever configuration changes become available. In another aspect of the invention, updates to the configuration information may be dynamically stored in the database and/or memory, and real time updates may be provided.

An access point such as any one of access points (APs) 310, 312, 314, 316, 318, 320 and/or a switching device such as any one of switches 306, 308 may include intelligent software and/or circuitry that may utilize information such as global position satellite (GPS) information for determining its location and/or a location of an access device such as access devices 322, 324, 326, 328, 330, 332, 334, 336, 338 attempting communication with the access point. In this regard, the access device, switching device and/or access point may be adapted to include an embedded or interconnected GPS device. The access point and/or switch may also utilize other information such voltage/frequency of an AC power supply, broadcast channel frequency, RF channel frequencies, and/or local time as hints to determine location. For example, an access point may be adapted to check known channel broadcasting information such as a RF frequency and use this information to determine protocol or configuration information for that location. The RF frequency may be mapped to the protocol or configuration information for a particular region and stored in the database or memory. The protocol or configuration information may be retrieved from the database and/or memory and subsequently communicated to one or more access devices, access points and/or switches.

In another embodiment of the invention, an access device such as any one of access devices 322, 324, 326, 328, 330, 332, 334, 336, 338 may be adapted to inform an access point such as any one of access points (APs) 310, 312, 314, 316, 318, 320 of its location. In a case where an access device or client may have a suitable GPS device, the access device or client may be adapted to autonomously communicate its location to the access device. In another aspect of the invention, a user of an access device may be given a capability to manually select or enter information pertaining to their location. For example, a location code, or location name or string may be provided such as by manual entry and/or selection by a user. In this regard, the access device may be adapted to provide the capability to enter and/or select the location code and/or location name. In any case, once the location information, which may include the location code, location name and/or location string, is entered, an access device may communicate the location information to an access point. Based on this information, the access point may determine appropriate network specific configuration information and parameters and communicate this information back to the access device.

In another embodiment of the invention, the access point may be adapted to determine its location or the location of an access device based on routing table information. In one aspect of the invention, a ping message, for example, may be used to examine routing table information and the information may be used to determine a location of the access point and/or the access device. Server and/or node information in the routing table may be used to determine an identity of one or more servers and/or nodes, and based on the identity of one or more of the servers and/or nodes, a corresponding location may be determined. Accordingly, a server or node name associated with a last hop may provide information about the location of an access device and/or access point. In another aspect of the invention, a triangulation scheme may be adapted and utilized for determine a location of a last hop server or node based on information in the routing table and an identity of each server and/or node. In another aspect of the invention, access point installation may include topology recognition, automatic distribution of pre-defined settings and detection and challenge of unauthorized access.

In another embodiment of the invention, MAC layer information and/or a super channel layer information may be used to determine and convey location information and/or configuration information to anyone or more of a switch, an access device and an access point. U.S. Provisional Application Ser. No. 60/433,198 entitled "Method and System for Providing a Super Channel in a Multi-Band, Multi-Protocol Hybrid Wired/Wireless Network" filed on Dec. 13, 2002 discloses information pertaining to a super channel and super channel related information. Accordingly, information such as a MAC address or an extended MAC address scheme may be utilized for sending location dependent information.

In a multi-band multi-protocol environment that utilizes for example a multi-band multi-protocol access point, the access point may be adapted to locate and select a most commonly utilized band and/or protocol to initiate a location query. For example, a multi-band multi-protocol access point or access device may be adapted to locate an 802.11b access point and initiate a query on a common 802.11b channel to determine particular communication parameters. These parameters may include, but are not limited to, signal strength, power level, and channel assignment. Accordingly, the query may be utilized to determine available network capabilities, for example 802.11a and/or 802.11g compatibility.

Figure 4:
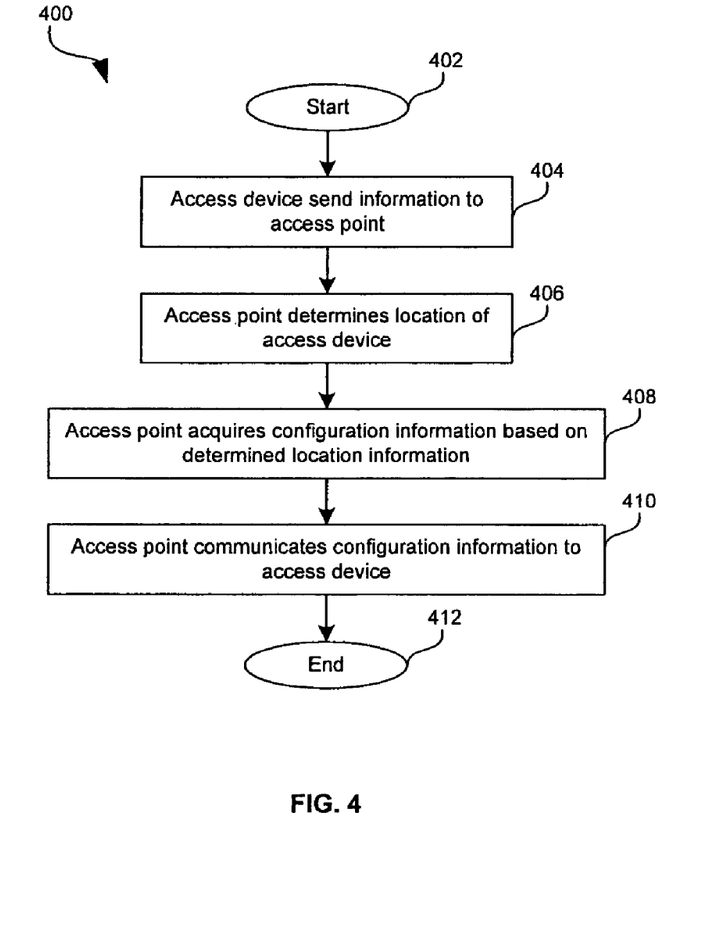
FIG. 4 is a flow chart illustrating exemplary steps for location based configuration in accordance with an embodiment of the invention.

FIG. 4 is a flow chart 400 illustrating exemplary steps for location based configuration in accordance with an embodiment of the invention. Referring to FIG. 4, the exemplary steps may start at step 402. In step 404, an access device may send communication information to an access point. In step 406, the access point may determine a location of the access device. In step 408, the access point may acquire configuration information based on the determined access point location. In step 410, the access point may communicate the configuration information to the access device. The steps may end at 412. Notwithstanding, it should be recognized that the invention is not limited to the steps described and modifications may be made to the steps without departing from the spirit of the invention.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for providing location based configuration in a hybrid wired/wireless network, the method comprising:
identifying a location of a network device within the hybrid wired/wireless network, the network device being movable within the hybrid wired/wireless network, where the network device is selected from a group consisting of an access device, an access point and a switching device;
determining, outside of said network device, configuration information for said network device, said configuration information corresponding to said identified location of said network device;
discovering at least a portion of said configuration information from at least one of a database, and a memory associated with at least one of said access point and said switching device, where said discovering comprises scanning said database and said memory by said access device, said access point and said switching device to discover said configuration information; and
communicating said determined configuration information to said network device, where said determined configuration information facilitates seamless network service to said network device without denial or disconnection from the hybrid wired/wireless network.

2. The method according to claim 1, wherein said determining comprises scanning at least one RF channel by at least one of said access point and said access device to discover at least a portion of said configuration information.

3. The method according to claim 2, wherein said RF channel is both a broadcast channel and a setup channel.

4. The method according to claim 1, comprising updating said network device with said communicated configuration information.

5. The method according to claim 4, comprising dynamically updating said network device with said communicated information whenever it is determined that at least one network setting corresponding to said location of said network device has changed.

6. The method according to claim 1, wherein said determined information is at least one of bandwidth etiquette and sharing rules, channel availability, preferred channel, and available communication protocols.

7. The method according to claim 1, wherein said determining comprises:
sending a ping message to one or more network routing devices;
receiving routing information associated with said ping message; and
triangulating locations of said one or more network routing devices named in said received routing information to determine said location of said network device.

8. The method according to claim 1, comprising querying said network device for location information.

9. The method according to claim 1, comprising informing at least one of said access point, said access device and said switching device of at least one network parameter related to said location based configuration.

10. A machine-readable storage, having stored thereon a computer program having at least one code section for providing location based configuration in a hybrid wired/wireless network testing, the at least one code section executable by a machine for causing the machine to perform the steps comprising:
identifying a location of a network device within the hybrid wired/wireless network, the network device being movable within the hybrid wired/wireless network, where said network device is selected from a group consisting of an access device, an access point and a switching device;
determining, outside of said network device, configuration information for said network device, said configuration information corresponding to said identified location of said network device;
discovering at least a portion of said configuration information from at least one of a database, and a memory associated with at least one of said access point and said switching device, where said discovering comprises scanning said database and said memory by said access device, access point and switching device to discover said configuration information; and
communicating said determined configuration information to said network device, said determined configuration information facilitates seamless network service to said network device without denial or disconnection from the hybrid wired/wireless network.

11. The machine-readable storage according to claim 10, wherein said determining code section comprises code for scanning at least one RF channel by at least one of said access point and said access device to discover at least a portion of said configuration information.

12. The machine-readable storage according to claim 11, wherein said RF channel is both a broadcast channel and a setup channel.

13. The machine-readable storage according to claim 10, comprising code for updating said network device with said communicated configuration information.

14. The machine-readable storage according to claim 13, comprising code for dynamically updating said network device with said communicated information whenever it is determined that at least one network setting corresponding to said location of said network device has changed.

15. The machine-readable storage according to claim 10, wherein said determined information is at least one of bandwidth etiquette and sharing rules, channel availability, preferred channel, and available communication protocols.

16. The machine-readable storage according to claim 10, wherein said determining code section comprises code for:
sending a ping message to one or more network routing devices;
receiving routing information associated with said ping message; and
triangulating locations of said one or more network routing devices named in said received routing information to determine said location of said network device.

17. The machine-readable storage according to claim 10, comprising code for querying said network device for location information.

18. The machine-readable storage according to claim 10, comprising code for informing at least one of said access point, said access device and said switching device of at least one network parameter related to said location based configuration.

19. A system for providing location based configuration in a hybrid wired/wireless network, the system comprising:
an identifier adapted to identify a location of a network device within the hybrid wired/wireless network, the network device being movable within the hybrid wired/wireless network, where said network device is selected from a group consisting of an access device, an access point and a switching device;
a determinator adapted to determine, outside of said network device, configuration information for said network device, said configuration information corresponding to said identified location of said network device;
a discoverer adapted to discover at least a portion of said configuration information from at least one of a database, and a memory associated with at least one of said access point and said switching device;
a scanner adapted to scan said database and said memory by said access device, access point and switching device to discover said configuration information; and
a communicator adapted to communicate said determined configuration information to said network device for providing location based configuration of said network device, said determined configuration information facilitates seamless network service to said network device without denial or disconnection from the hybrid wired/wireless network.

20. The system according to claim 19, comprising another scanner adapted to scan at least one RF channel by at least one of said access point and said access device to discover said configuration information.

21. The system according to claim 20, wherein said RF channel is both a broadcast channel and a setup channel.

22. The system according to claim 19, comprising an updater adapted to update said network device with said communicated configuration information.

23. The system according to claim 22, wherein said updater may be adapted to dynamically update said network device with said communicated information whenever it is determined that at least one network setting corresponding to said location of said network device has changed.

24. The system according to claim 19, wherein said determined information is at least one of bandwidth etiquette and sharing rules, channel availability, preferred channel, and available communication protocols.

25. The system according to claim 19, comprising:
a sender adapted to send at least one ping message to one or more network routing devices;
a receiver adapted to receive routing information associated with said ping message; and
a triangulator adapted to triangulate locations of said one or more network routing devices named in said received routing information to determine said location of said network device.

26. The system according to claim 19, comprising at least one querying agent for querying said network device for location information.

27. The system according to claim 19, comprising at least one informing agent for informing at least one of said access point, said access device and said switching device of at least one network parameter related to said location based configuration.

* * * * *